United States Patent
Li et al.

(10) Patent No.: US 12,264,820 B1
(45) Date of Patent: Apr. 1, 2025

(54) MULTI-STAGE MICRO-DECOMPOSITION SWIRL BURNER WITH AN AMMONIA-DOPED FUEL AND LOW $NO_X$ CONTROL METHOD

(71) Applicant: Tsinghua University, Beijing (CN)

(72) Inventors: Shuiqing Li, Beijing (CN); Tong Si, Beijing (CN); Peng Ma, Beijing (CN); Yuanping Yang, Beijing (CN); Xiang Wang, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 18/894,458

(22) Filed: Sep. 24, 2024

(30) Foreign Application Priority Data

Nov. 21, 2023 (CN) .......................... 202311560842.8

(51) Int. Cl.
*F23R 3/14* (2006.01)
*F02C 3/22* (2006.01)
*F23R 3/28* (2006.01)
*F23R 3/34* (2006.01)

(52) U.S. Cl.
CPC ................ *F23R 3/14* (2013.01); *F23R 3/286* (2013.01); *F23R 3/343* (2013.01); *F02C 3/22* (2013.01)

(58) Field of Classification Search
CPC .... F23R 3/14; F23R 3/286; F23R 3/34; F23R 3/343; F23R 3/346; F23R 3/36; F02C 3/20; F02C 3/22; F02C 7/22

See application file for complete search history.

(56) References Cited

U.S. PATENT DOCUMENTS

| | | | | |
|---|---|---|---|---|
| 6,026,645 A | * | 2/2000 | Stokes | F23R 3/286 60/737 |
| 6,038,861 A | * | 3/2000 | Amos | F23R 3/34 60/737 |
| 6,082,111 A | * | 7/2000 | Stokes | F23R 3/286 60/737 |
| 11,946,644 B1 | * | 4/2024 | Quay | F23R 3/286 |
| 2001/0004827 A1 | * | 6/2001 | Vandervort | F23R 3/36 60/737 |
| 2003/0014975 A1 | * | 1/2003 | Nishida | F23R 3/343 60/737 |
| 2003/0217556 A1 | * | 11/2003 | Wiebe | F23R 3/283 60/740 |
| 2004/0093851 A1 | * | 5/2004 | Dawson | F23R 3/286 60/746 |

(Continued)

*Primary Examiner* — William H Rodriguez
(74) *Attorney, Agent, or Firm* — Kirk A. Wilson; Joseph T. Guy; Patent Filing Specialist Inc.

(57) ABSTRACT

A multi-stage micro-decomposition swirl burner with an ammonia-doped fuel, and a low $NO_x$ control method are provided. A natural gas central pipe, a primary air pipe and a burner housing are nested from inside to outside in sequence to form a primary air duct and an over-fire air channel which are isolated from each other. Natural gas is ejected from the natural gas central pipe, and swirl vanes are arranged in the primary air duct, such that the primary air can be mixed with the central natural gas in a swirl state, and then a diffusion flame is formed under the action of an ignition device. Therefore, a pilot flame with sustainable combustion is formed at the center of an injection end of the burner.

20 Claims, 3 Drawing Sheets

(56) References Cited

U.S. PATENT DOCUMENTS

| | | | |
|---|---|---|---|
| 2009/0223225 A1* | 9/2009 | Kraemer | F23R 3/40 |
| | | | 60/737 |
| 2009/0223228 A1* | 9/2009 | Romoser | F02C 7/264 |
| | | | 60/776 |
| 2010/0077760 A1* | 4/2010 | Laster | F23R 3/286 |
| | | | 60/742 |
| 2010/0308135 A1* | 12/2010 | Yamamoto | F23R 3/343 |
| | | | 239/402 |
| 2011/0072824 A1* | 3/2011 | Zuo | F23R 3/14 |
| | | | 60/746 |
| 2012/0266602 A1* | 10/2012 | Haynes | F23R 3/14 |
| | | | 60/746 |
| 2012/0285173 A1* | 11/2012 | Poyyapakkam | F23C 7/004 |
| | | | 60/748 |
| 2013/0219899 A1* | 8/2013 | Uhm | F23C 7/004 |
| | | | 60/738 |
| 2017/0298875 A1* | 10/2017 | Patel | F02M 29/06 |
| 2019/0107282 A1* | 4/2019 | Seo | F23C 7/004 |
| 2019/0107284 A1* | 4/2019 | Seo | F23R 3/286 |
| 2021/0025323 A1* | 1/2021 | Nakao | F23R 3/06 |
| 2022/0205637 A1* | 6/2022 | Estefanos | F23R 3/343 |
| 2023/0104922 A1* | 4/2023 | Berry | F28F 13/12 |
| | | | 60/730 |
| 2024/0240792 A1* | 7/2024 | Tatebayashi | F23R 3/28 |

* cited by examiner

MULTI-STAGE MICRO-DECOMPOSITION SWIRL BURNER WITH AN AMMONIA-DOPED FUEL AND LOW $NO_X$ CONTROL METHOD

CROSS-REFERENCE TO RELATED APPLICATION

This patent application is a direct entry US application, which claims the benefit and priority to Chinese Patent Application No. 202311560842.8, filed on Nov. 21, 2023, and is incorporated by reference in its entirety. A related International Patent Application No. PCT/CN2024/099659 was filed on Jun. 17, 2024.

TECHNICAL FIELD

The present disclosure belongs to the field of combustion equipment, relates to a burner for burning gas fuel, and in particular to a multi-stage micro-decomposition swirl burner with an ammonia-doped fuel, and a low $NO_x$ control method.

BACKGROUND

In the combustion of premixed swirl burner, the mixing ratio and uniformity of the ammonia-doped fuel and the oxidant directly determine the emission effect of the $NO_x$ (combustion of nitrogen oxides) of the burner. The existing swirl burner has unsatisfactory flame effect and high emission of nitrogen oxides due to insufficient mixing of the ammonia-doped fuel and the oxidant, and thus can no longer meet the current requirements for safety and environmental protection of the burner.

SUMMARY

A purpose of the present disclosure is to provide a multi-stage micro-decomposition swirl burner with an ammonia-doped fuel, and a low $NO_x$ control method. The combustion stability is high, and the $NO_x$ emission is low, and thus the problems of unsatisfactory flame effect and high emission of nitrogen oxides caused by insufficient mixing of the ammonia-doped fuel and an oxidant in the existing burner can be solved.

To achieve the purpose above, the present disclosure provides the following technical solution:

A multi-stage micro-decomposition swirl burner with an ammonia-doped fuel includes a natural gas central pipe, a primary air pipe, and a burner housing which are nested from inside to outside in sequence, a primary air duct is formed between an outer wall of the natural gas central pipe and an inner wall of the primary air pipe, and an over-fire air channel is formed between an outer wall of the primary air pipe and an inner wall of the burner housing.

An ignition device and swirl vanes are arranged in the primary air duct, the swirl vanes are installed at a periphery of an outlet end of the natural gas central pipe, and configured to enable primary air in the primary air duct to be mixed with a natural gas ejected from the outlet end of the natural gas central pipe in a swirling state, the ignition device is configured to ignite a mixture of the primary air and the natural gas to form a pilot flame with sustainable combustion at the outlet end of the natural gas central pipe.

Fuel distribution nozzles are arranged in the over-fire air channel, and the fuel distribution nozzles are arranged adjacent to the outlet end of the natural gas central pipe; several micro-decomposition holes are formed at an outlet end of each of the fuel distribution nozzles to eject the ammonia-doped fuel at a high speed, so as to enable ammonia in the ammonia-doped fuel to be burned under an action of the pilot flame, and enable a negative pressure to be formed at a port of the over-fire air channel when the ammonia-doped fuel is ejected at a high speed, to entrain over-fire air formed by burning the ammonia-doped fuel.

Alternatively, primary air distribution pipes, which are in communication with the primary air duct, are arranged at the outer wall of the primary air pipe, the primary air distribution pipes are located in the over-fire air channel, outlet ends of the primary air distribution pipes are located at a periphery of an outlet end of the primary air pipe, and are longer than both the outlet end of the natural gas central pipe and the outlet end of the primary air pipe.

Alternatively, distribution pipe nozzles are respectively arranged at the outlet ends of the primary air distribution pipes, and axial included angles between the distribution pipe nozzles and the primary air pipe are adjustable.

Alternatively, multiple primary air distribution pipes are uniformly distributed on the outer wall of the primary air pipe in a circumferential direction thereof.

Alternatively, multiple fuel distribution nozzles are arranged in the over-fire air channel, and all the multiple fuel distribution nozzles are uniformly distributed in a circumferential direction of the primary air pipe; and the micro-decomposition holes in any of the multiple fuel distribution nozzles are uniformly distributed.

Alternatively, the ignition device is an ignition gun.

Alternatively, the swirl vanes include multiple rotary vanes uniformly distributed at intervals in a circumferential direction, and an included angle between any of the multiple rotary vanes and an axial direction of the primary air pipe is 30°-45°.

Alternatively, a diameter of any of the micro-decomposition holes is from 3 mm to 7 mm.

A low $NO_x$ control method is further provided, which is implemented by using any multi-stage micro-decomposition swirl burner with the ammonia-doped fuel above. The method includes the following steps: ejecting 20% by volume of natural gas through the outlet end of the natural gas central pipe, and mixing an ejected natural gas with the primary air under an action of the ignition device, and burning a mixture of the ejected natural gas and the primary air to form the pilot flame; and premixing 80% by volume of the natural gas with an ammonia gas to form the ammonia-doped fuel, injecting the ammonia-doped fuel pre-mixed with a preset equivalent ratio into a flame zone formed by the pilot flame via the fuel distribution nozzles, making ammonia in the ammonia-doped fuel burned and decomposed under the action of the pilot flame.

Alternatively, in the combustion process of the ammonia-doped fuel, controlling overall equivalence ratios of the ammonia-doped fuel and the multi-stage micro-decomposition swirl burner with the ammonia-doped fuel in a lean combustion state, and controlling local equivalence ratios of the over-fire air and the ammonia-doped fuel in a fuel-rich combustion state.

Alternatively, in the combustion process of the ammonia-doped fuel, controlling the overall equivalence ratios of the ammonia-doped fuel and the multi-stage micro-decomposition swirl burner with the ammonia-doped fuel to be 0.7-0.8, and controlling the local equivalence ratios of over-fire air and the ammonia-doped fuel to be 1.0-1.3.

Compared with the prior art, the present disclosure achieves the following technical effects:

A multi-stage micro-decomposition swirl burner with an ammonia-doped fuel is provided. A natural gas central pipe, a primary air pipe and a burner housing are nested from inside to outside in sequence to form a primary air duct and an over-fire air channel which are isolated from each other. Natural gas is ejected from the natural gas central pipe, and swirl vanes are arranged in the primary air duct, and located around the natural gas central pipe, such that the primary air can be mixed with the central natural gas in a swirl state, and then a diffusion flame is formed under the action of an ignition device. Therefore, a pilot flame with sustainable combustion can be formed at the center of an injection end of the multi-stage micro-decomposition swirl burner with the ammonia-doped fuel. An ammonia gas and the natural gas are premixed to form the ammonia-doped fuel which is ejected at a high speed through micro-decomposition holes to form a negative pressure to continuously entrain surrounding over-fire air. Meanwhile, the ammonia-doped fuel is injected into a high-temperature combustion zone of the pilot flame at the center of the burner to enable the ammonia to be rapidly decomposed, and a large amount of generated hydrogen is conducive to improving the combustion stability. The multi-stage micro-decomposition swirl burner is novel and reasonable in structure layout, can improve the combustion stability, and reduce $NO_x$ emission.

In some technical solutions of the present disclosure, primary air distribution pipes with angle-adjustable nozzles are arranged outside the primary air pipe, and outlet ends of the primary air distribution pipes are longer than that of each of the natural gas central pipe and the primary air pipe, such that part of the primary air can be delayed to enter the combustion zone, the sufficient burning of the fuel is guaranteed, and the combustion stability is further improved.

BRIEF DESCRIPTION OF THE DRAWINGS

To describe the technical solutions of the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

The numeral references in the accompanying drawings are as follows:

100 multi-stage micro-decomposition swirl burner with an ammonia-doped fuel 1 natural gas central pipe; 2 primary air pipe; 3 burner housing; 4 primary air duct; 5 over-fire air channel; 6 ignition device; 7 swirl vane; 8 fuel distribution nozzle; 81 micro-decomposition hole; 9 fuel inlet pipe; 10 primary air distribution pipe; 11 bluff body.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

A purpose of the present disclosure is to provide a multi-stage micro-decomposition swirl burner with an ammonia-doped fuel. The combustion stability is high, and the $NO_x$ emission is low, and thus the problems of unsatisfactory flame effect and high emission of nitrogen oxides caused by insufficient mixing of the ammonia-doped fuel and an oxidant in the existing burner can be solved.

Another purpose of the present disclosure is to provide a low $NO_x$ combustion control method implemented based on the multi-stage micro-decomposition swirl burner with the ammonia-doped fuel. The combustion stability is high, and the $NO_x$ emission is low, and thus the problems of unsatisfactory flame effect and high emission of nitrogen oxides caused by insufficient mixing of the ammonia-doped fuel and an oxidant in the existing burner can be solved.

In order to make the purposes, features and advantages of the present disclosure more clearly, the present disclosure is further described in detail below in conjunction with the accompanying drawings and the embodiments.

Embodiment 1

Figure 1:
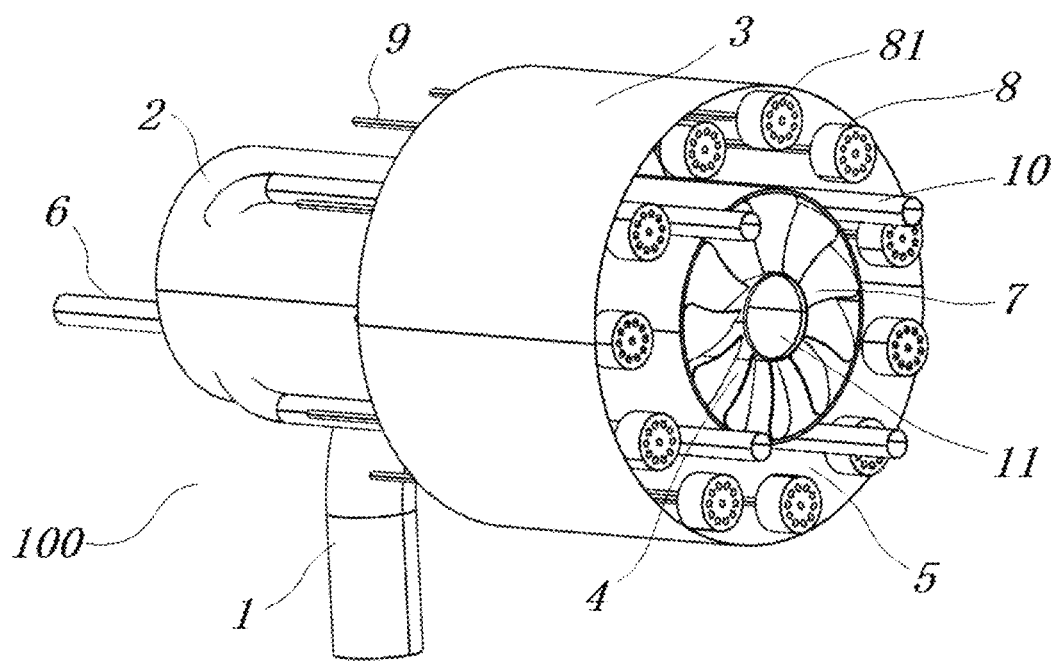
FIG. 1 is a structural diagram of a multi-stage micro-decomposition swirl burner with an ammonia-doped fuel according to embodiments of the present disclosure.
Figure 2:
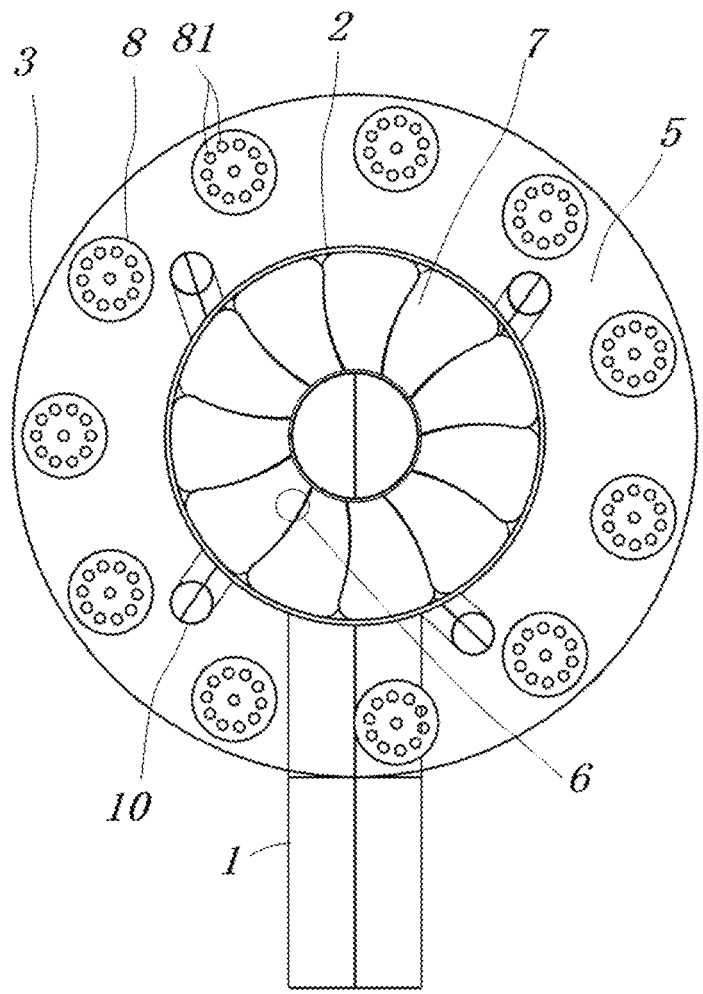
FIG. 2 is a front view of a multi-stage micro-decomposition swirl burner with the ammonia-doped fuel according to embodiments of the present disclosure.
Figure 3:
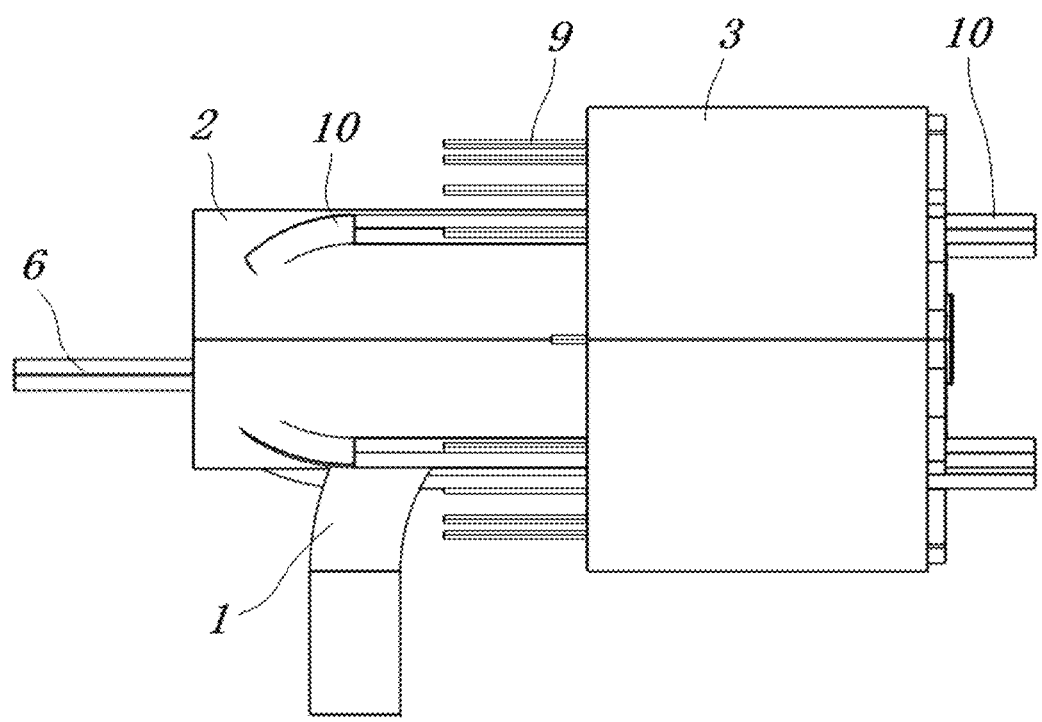
FIG. 3 is a side view of a multi-stage micro-decomposition swirl burner with the ammonia-doped fuel according to embodiments of the present disclosure.

As shown in FIG. 1 to FIG. 3, a multi-stage micro-decomposition swirl burner with an ammonia-doped fuel 100 is provided by this embodiment, including a natural gas central pipe 1, a primary air pipe 2, and a burner housing 3 which are nested from inside to outside in sequence. A primary air duct 4 is formed between an outer wall of the natural gas central pipe 1 and an inner wall of the primary air pipe 2, and an over-fire air channel 5 is formed between an outer wall of the primary air pipe 2 and an inner wall of the burner housing 3. An ignition device 6 and swirl vanes 7 are arranged in the primary air duct 4, the swirl vanes 7 are installed at a periphery of an outlet end of the natural gas central pipe 1, and configured to enable primary air in the primary air duct 4 to be mixed with a natural gas ejected from the outlet end of the natural gas central pipe 1 in a swirling state. The ignition device 6 is configured to ignite a mixture of the primary air and the natural gas to form a pilot flame with sustainable combustion at the outlet end of the natural gas central pipe 1. Fuel distribution nozzles 8 are arranged in the over-fire air channel 5, and the fuel distribution nozzles 8 are arranged adjacent to the outlet end of the natural gas central pipe 1. Several micro-decomposition holes 81 are formed at an outlet end of each of the fuel distribution nozzles 8 to eject the ammonia-doped fuel at a high speed, such that ammonia in the ammonia-doped fuel is burned under the action of the pilot flame. When the ammonia-doped fuel is ejected at a high speed, a negative pressure is formed at a port of the over-fire air channel 5 to entrain over-fire air formed by burning the ammonia-doped fuel.

In this embodiment, primary air distribution pipes 10, which are in communication with the primary air duct 4, are arranged at the outer wall of the primary air pipe 2. The primary air distribution pipes 10 are located in the over-fire air channel 5, outlet ends of the primary air distribution pipes 10 are located at a periphery of the outlet end of the primary air pipe 2, and are longer than both the outlet end of the natural gas central pipe 1 and the outlet end of the primary air pipe 2. The primary air ejected from the primary air distribution pipes 10 can enter a combustion zone later than the primary air ejected from the primary air pipe 2, thus ensuring that the fuel can be sufficiently burned. Inlet ends of the primary air distribution pipes 10 are generally connected to a position, close to a tail end, of the primary air pipe 2. After the primary air is introduced into the primary air pipe 2, the primary air can flow into the primary air distribution pipes 10 immediately.

In this embodiment, distribution pipe nozzles are respectively arranged at the outlet ends of the primary air distribution pipes 10, and axial included angles between the distribution pipe nozzles and the primary air pipe 2 are adjustable, generally ranging from −45° to 45°. Regarding the angle adjustment of the distribution pipe nozzles, nozzles with an angle adjustment function can be directly used, such as a universal nozzle, or a spherical angle adjustment nozzle disclosed in patent CN95106474.6, etc. The nozzle may also be installed using an existing injection angle adjustment structure which can be used to adjust an axial angle between the distribution pipe nozzle and the primary air pipe 2. The injection angle adjustment structure may use a universal valve, a universal regulator, or a structure disclosed in patent CN101121157A, etc.

In this embodiment, the ratio of air flow passing through any primary air distribution pipe 10 to the total primary air is equal to a ratio of the cross-sectional area of the primary air distribution pipe 10 to the cross-sectional area of the primary air pipe 2.

In this embodiment, multiple primary air distribution pipes 10 are uniformly distributed on the outer wall of the primary air pipe 2 in a circumferential direction thereof.

In this embodiment, multiple fuel distribution nozzles 8 are arranged in the over-fire air channel 5, and all the fuel distribution nozzles 8 are uniformly distributed in a circumferential direction of the primary air pipe 2. The micro-decomposition holes in any fuel distribution nozzle 8 are uniformly distributed, so that the distribution of the flow field at an outlet of the burner can be uniform. As a further preferred solution, the fuel distribution nozzles 8 are distributed on the periphery of the multiple primary air distribution pipes 10, as shown in FIG. 1 and FIG. 2, and the outlet ends of the primary air distribution pipes 10 are longer than that of the fuel distribution nozzles 8.

In this embodiment, a fuel inlet pipe 9 is further connected to each fuel distribution nozzle 8. All the fuel inlet pipes 9 connected to the fuel distribution nozzles 8 are preferably of the same diameter, parallel to each other and uniformly distributed at intervals. The load of the multi-stage micro-decomposition swirl burner with an ammonia-doped fuel 100 can be adjusted according to the opening number of the fuel inlet pipes 9.

In this embodiment, the ignition device 6 is preferably an ignition gun. The ignition gun can be used as a gas inlet channel of other fuel after the ignition is completed.

In this embodiment, the swirl vanes 7 include multiple rotary vanes uniformly distributed at intervals in a circumferential direction, and an included angle between any rotary vane and an axial direction of the primary air pipe 2 is 30°-45°.

In this embodiment, a diameter of any micro-decomposition hole 81 is from 3 mm to 7 mm. Further, the diameter of any micro-decomposition hole 81 may specifically be 3 mm, 5 mm, or 7 mm.

In this embodiment, the entire natural gas central pipe 1 is of a bend structure, one end of the natural gas central pipe 1 is located inside the primary air pipe 2 and coaxially with the primary air pipe 2, and the other end of the natural gas central pipe 1 penetrates through a side wall of the primary air pipe 2 and extends out of the primary air pipe 2, as shown in FIG. 1 to FIG. 3. Such a structural arrangement is convenient to ventilate the natural gas central pipe 1 and the primary air pipe 2 at the same time, thus avoiding mutual interference of the natural gas central pipe 1 and the primary air pipe 2 caused by simultaneous ventilation. An inner wall of the outlet end of the natural gas central pipe 1 is in the shape of a bluff body, thus conforming to the aerodynamics of the bluff body. The arrangement of the bluff body 11 is a conventional technical means in the field of burners, and thus will not be described in detail here.

A multi-stage micro-decomposition swirl burner 100 with an ammonia-doped fuel is provided. A natural gas central pipe 1, a primary air pipe 2 and a burner housing 3 are nested from inside to outside in sequence to form a primary air duct 4 and an over-fire air channel 5 which are isolated from each other. Natural gas is ejected from the natural gas central pipe 1, which accounts for 20% of the volume of the natural gas. The swirl vanes 7 are arranged in the primary air duct 4, and located around the natural gas central pipe 1, such that the primary air can be mixed with the central natural gas in a swirling state, and then a diffusion flame is formed under the action of an ignition device 6. Therefore, a pilot flame with sustainable combustion can be formed at the center of an injection end of the multi-stage micro-decomposition swirl burner with an ammonia-doped fuel 100. Primary air distribution pipes 10 with angle-adjustable nozzles are arranged outside the primary air pipe 2, and outlet ends of the primary air distribution pipes 10 are longer than that of each of the natural gas central pipe 1 and the primary air pipe 2, such that part of the primary air can be delayed to enter the combustion zone, and the sufficient burning of the fuel is guaranteed. Multiple fuel distribution nozzles 8 each composed of multiple micro-decomposition holes 81 are arranged on the periphery of the primary air distribution pipe 10. 100% ammonia gas is premixed with the remaining 80% natural gas to form the ammonia-doped fuel, the ammonia-doped fuel is rectified by the fuel inlet pipes 9 connected to the fuel distribution nozzles 8 and then ejected from the micro-decomposition holes 81 at a high speed to form a negative pressure to continuously entrain the surrounding over-fire air. Meanwhile, the ammonia-doped fuel is injected into a high-temperature combustion zone of the pilot flame at the center of the burner, such that the ammonia can be rapidly decomposed, and a large amount of generated hydrogen is conducive to improving the combustion stability. In the combustion process of the ammonia-doped fuel, overall equivalence ratios of the ammonia-doped fuel and the multi-stage micro-decomposition swirl burner with the ammonia-doped fuel 100 are generally controlled in a lean combustion state, for example, the overall equivalence ratios of the ammonia-doped fuel and the multi-stage micro-decomposition swirl burner with the ammonia-doped fuel 100 are controlled to be 0.7-0.8. Meanwhile, local equivalence ratios of the over-fire air and the ammonia-doped fuel are generally controlled in a fuel-rich combustion state, for example, the local equivalence ratios of the over-fire air and the ammonia-doped fuel are controlled to be 1.0-1.3. As a further preferred solution, in the combustion process of the ammonia-doped fuel, the local equivalence ratios of the over-fire air and the ammonia-doped fuel are controlled about 1.2.

Therefore, in the multi-stage micro-decomposition swirl burner with an ammonia-doped fuel 100 provided in this technical solution, the central natural gas and swirl air first form a stable high-temperature pilot flame under the action of the ignition device 6 during operation, and the remaining natural gas and the ammonia gas are premixed and then injected into a high-temperature zone formed by the combustion of the high-temperature pilot flame through the micro-decomposition holes 81 in a certain equivalence ratio. In combination with the arrangement of the primary air distribution pipe, the combustion stability can be improved and the $NO_x$ emission can be reduced on the basis of achieving fuel burn-out. Compared with the prior art, the technical solution has the following beneficial technical effects:

1. A multi-stage micro-decomposition swirl burner with an ammonia-doped fuel capable of achieving accurate $NO_x$ control can solve the problem of high $NO_x$ emission of the ammonia-doped fuel at present.
2. Combustion is composed of flame zones at different internal and external channels. A flame field generated by the central pilot flame can provide a stable high-temperature environment for the decomposition of ammonia fuel, with high combustion stability and low $NO_x$ emission.
3. The combustion power of the burner can be adjusted by adjusting the opening number of the fuel inlet pipes 9.
4. The design of micro-decomposition holes achieves high flow velocity of the fuel, thus effectively preventing the phenomenon of combustion backfire.
5. The primary air duct 4, the over-fire air channel 5 and the primary air distribution pipes 10 are hermetically connected and divided, such that all stages of fuels and oxidants can reach a uniform mixing state when reaching a plane position at the outlet of the burner, and the premixing of the fuels and oxidants is avoided. According to required working conditions, the rapid decomposition of the ammonia-doped fuel and the low $NO_x$ combustion technology can be achieved by accurately controlling the ratio between the fuel and the oxidant.

The above is only the preferred embodiment of the present disclosure, and is not used to limit the present disclosure. Any modification, equivalent substitution, improvement, etc. made within the spirit and principle of the present disclosure should be included in the scope of protection of the present disclosure.

What is claimed is:

1. A multi-stage micro-decomposition swirl burner with an ammonia-doped fuel, comprising a natural gas central pipe (1), a primary air pipe (2), and a burner housing (3) which are nested from inside to outside in sequence, wherein a primary air duct (4) is formed between an outer wall of the natural gas central pipe (1) and an inner wall of the primary air pipe (2), and an over-fire air channel (5) is formed between an outer wall of the primary air pipe (2) and an inner wall of the burner housing (3);

an ignition device (6) and swirl vanes (7) are arranged in the primary air duct (4), the swirl vanes (7) are installed at a periphery of an outlet end of the natural gas central pipe (1), and configured to enable primary air in the primary air duct (4) to be mixed with a natural gas ejected from the outlet end of the natural gas central pipe (1) in a swirling state, the ignition device (6) is configured to ignite a mixture of the primary air and the natural gas to form a pilot flame with sustainable combustion at the outlet end of the natural gas central pipe (1); and fuel distribution nozzles (8) are arranged in the over-fire air channel (5), and the fuel distribution nozzles (8) are arranged adjacent to the outlet end of the natural gas central pipe (1); several micro-decomposition holes (81) are formed at an outlet end of each of the fuel distribution nozzles (8) to eject the ammonia-doped fuel at a high speed, so as to enable ammonia in the ammonia-doped fuel to be burned under an action of the pilot flame, and enable a negative pressure to be formed at a port of the over-fire air channel (5) when the ammonia-doped fuel is ejected at a high speed, to entrain over-fire air formed by burning the ammonia-doped fuel.

2. The multi-stage micro-decomposition swirl burner with the ammonia-doped fuel according to claim 1, wherein primary air distribution pipes (10), which are in communication with the primary air duct (4), are arranged at the outer wall of the primary air pipe (2), the primary air distribution pipes (10) are located in the over-fire air channel (5), outlet ends of the primary air distribution pipes (10) are located at a periphery of an outlet end of the primary air pipe (2), and are longer than both the outlet end of the natural gas central pipe (1) and the outlet end of the primary air pipe (2).

3. The multi-stage micro-decomposition swirl burner with the ammonia-doped fuel according to claim 2, wherein distribution pipe nozzles are respectively arranged at the outlet ends of the primary air distribution pipes (10), and axial included angles between the distribution pipe nozzles and the primary air pipe (2) are adjustable.

4. The multi-stage micro-decomposition swirl burner with the ammonia-doped fuel according to claim 2, wherein a plurality of primary air distribution pipes (10) are uniformly distributed on the outer wall of the primary air pipe (2) in a circumferential direction thereof.

5. The multi-stage micro-decomposition swirl burner with the ammonia-doped fuel according to claim 1, wherein a plurality of fuel distribution nozzles (8) are arranged in the over-fire air channel (5), and all the plurality of fuel distribution nozzles (8) are uniformly distributed in a circumferential direction of the primary air pipe (2); and the micro-decomposition holes (81) in any of the plurality of fuel distribution nozzles (8) are uniformly distributed.

6. The multi-stage micro-decomposition swirl burner with the ammonia-doped fuel according to claim 1, wherein the ignition device (6) is an ignition gun.

7. The multi-stage micro-decomposition swirl burner with the ammonia-doped fuel according to claim 1, wherein the swirl vanes (7) comprise a plurality of rotary vanes uniformly distributed at intervals in a circumferential direction, and an included angle between any of the plurality of rotary vanes and an axial direction of the primary air pipe (2) is 30°-45°.

8. The multi-stage micro-decomposition swirl burner with the ammonia-doped fuel according to claim 1, wherein a diameter of any of the micro-decomposition holes (81) is from 3 mm to 7 mm.

9. The multi-stage micro-decomposition swirl burner with the ammonia-doped fuel according to claim 3, wherein a plurality of primary air distribution pipes (10) are uniformly distributed on the outer wall of the primary air pipe (2) in a circumferential direction thereof.

10. The multi-stage micro-decomposition swirl burner with the ammonia-doped fuel according to claim 2, wherein a plurality of fuel distribution nozzles (8) are arranged in the over-fire air channel (5), and all the plurality of fuel distribution nozzles (8) are uniformly distributed in a circumferential direction of the primary air pipe (2); and the micro-decomposition holes (81) in any of the plurality of fuel distribution nozzles (8) are uniformly distributed.

11. The multi-stage micro-decomposition swirl burner with the ammonia-doped fuel according to claim 3, wherein a plurality of fuel distribution nozzles (8) are arranged in the over-fire air channel (5), and all the plurality of fuel distribution nozzles (8) are uniformly distributed in a circumferential direction of the primary air pipe (2); and the micro-decomposition holes (81) in any of the plurality of fuel distribution nozzles (8) are uniformly distributed.

12. The multi-stage micro-decomposition swirl burner with the ammonia-doped fuel according to claim 2, wherein the ignition device (6) is an ignition gun.

13. The multi-stage micro-decomposition swirl burner with the ammonia-doped fuel according to claim 3, wherein the ignition device (6) is an ignition gun.

14. The multi-stage micro-decomposition swirl burner with the ammonia-doped fuel according to claim 2, wherein the swirl vanes (7) comprise a plurality of rotary vanes uniformly distributed at intervals in a circumferential direction, and an included angle between any of the plurality of rotary vanes and an axial direction of the primary air pipe (2) is 30°-45°.

15. The multi-stage micro-decomposition swirl burner with the ammonia-doped fuel according to claim 3, wherein the swirl vanes (7) comprise a plurality of rotary vanes uniformly distributed at intervals in a circumferential direction, and an included angle between any of the plurality of rotary vanes and an axial direction of the primary air pipe (2) is 30°-45°.

16. The multi-stage micro-decomposition swirl burner with the ammonia-doped fuel according to claim 2, wherein a diameter of any of the micro-decomposition holes (81) is from 3 mm to 7 mm.

17. The multi-stage micro-decomposition swirl burner with the ammonia-doped fuel according to claim 3, wherein a diameter of any of the micro-decomposition holes (81) is from 3 mm to 7 mm.

18. A low $NO_x$ control method, wherein the method is implemented by using the multi-stage micro-decomposition swirl burner with the ammonia-doped fuel according to claim 1, and comprises the following steps:

ejecting 20% by volume of natural gas through the outlet end of the natural gas central pipe (1), and mixing an ejected natural gas with the primary air under an action of the ignition device (6), and burning a mixture of the ejected natural gas and the primary air to form the pilot flame; and premixing 80% by volume of the natural gas with an ammonia gas to form the ammonia-doped fuel, injecting the ammonia-doped fuel pre-mixed with a preset equivalent ratio into a flame zone formed by the pilot flame via the fuel distribution nozzles (8), making ammonia in the ammonia-doped fuel burned and decomposed under the action of the pilot flame.

19. The low $NO_x$ control method according to claim 18, wherein in the combustion process of the ammonia-doped fuel, controlling overall equivalence ratios of the ammonia-doped fuel and the multi-stage micro-decomposition swirl burner with the ammonia-doped fuel in a lean combustion state, and controlling local equivalence ratios of the over-fire air and the ammonia-doped fuel in a fuel-rich combustion state.

20. The low $NO_x$ control method according to claim 18, wherein primary air distribution pipes (10), which are in communication with the primary air duct (4), are arranged at the outer wall of the primary air pipe (2), the primary air distribution pipes (10) are located in the over-fire air channel (5), outlet ends of the primary air distribution pipes (10) are located at a periphery of an outlet end of the primary air pipe (2), and are longer than both the outlet end of the natural gas central pipe (1) and the outlet end of the primary air pipe (2).

* * * * *